United States Patent [19]

Kikukawa et al.

[11] Patent Number: 4,513,236
[45] Date of Patent: Apr. 23, 1985

[54] CONTROL METHOD FOR STEPPING MOTOR

[75] Inventors: Noriyuki Kikukawa, Yokohama; Yasuaki Yamada, Matsudo, both of Japan

[73] Assignee: Canon Kabushiki Kaisha, Tokyo, Japan

[21] Appl. No.: 509,183

[22] Filed: Jun. 29, 1983

[51] Int. Cl.³ .............................. H02K 29/04
[52] U.S. Cl. .............................. 318/696; 318/685
[58] Field of Search .............................. 318/696, 685

[56] References Cited

U.S. PATENT DOCUMENTS 4,218,643  8/1980  Herald et al. ............ 318/696
4,329,635  5/1982  Reilly ..................... 318/696

FOREIGN PATENT DOCUMENTS 79104883.8  4/1979  European Pat. Off. .
1555056     2/1968  France .
1151037     5/1969  United Kingdom .
1439991     6/1976  United Kingdom .

Primary Examiner—S. J. Witkowski
Assistant Examiner—Saul M. Bergmann
Attorney, Agent, or Firm—Fitzpatrick, Cella, Harper & Scinto

[57] ABSTRACT

This invention discloses a control method for a novel stepping motor and a novel stepping motor of unipolar or bipolar winding, in which an inverse electromotive force generated in the unenergized coils is utilized for motor control.

15 Claims, 11 Drawing Figures

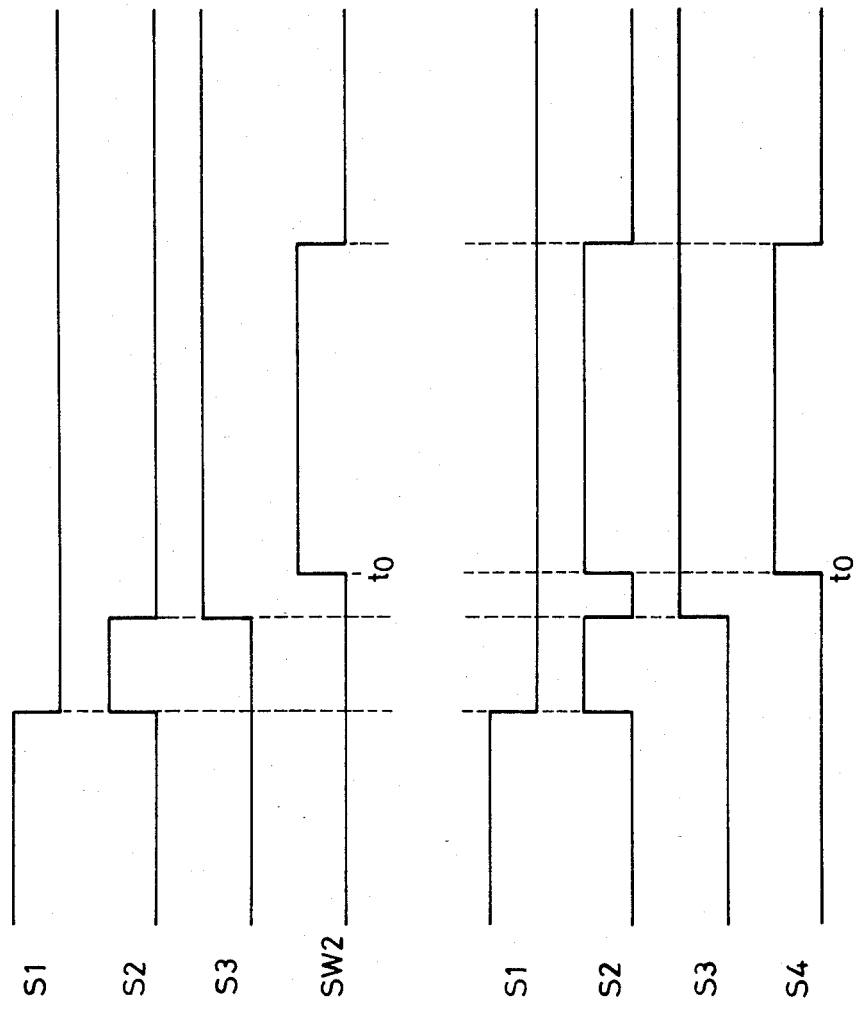

FIG. 4
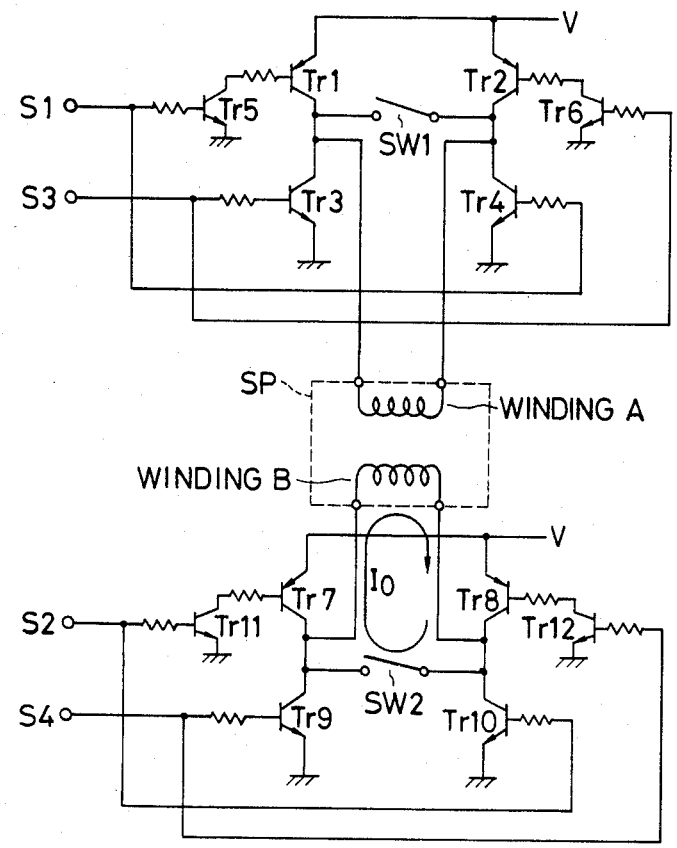
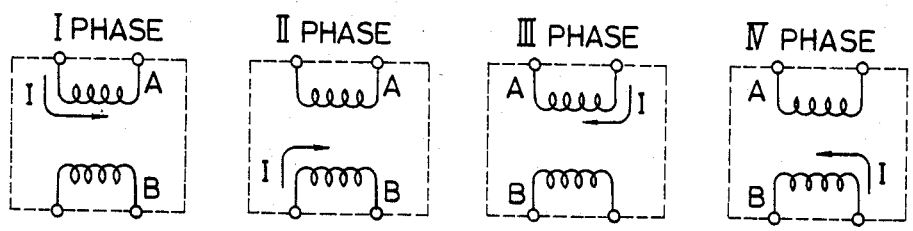

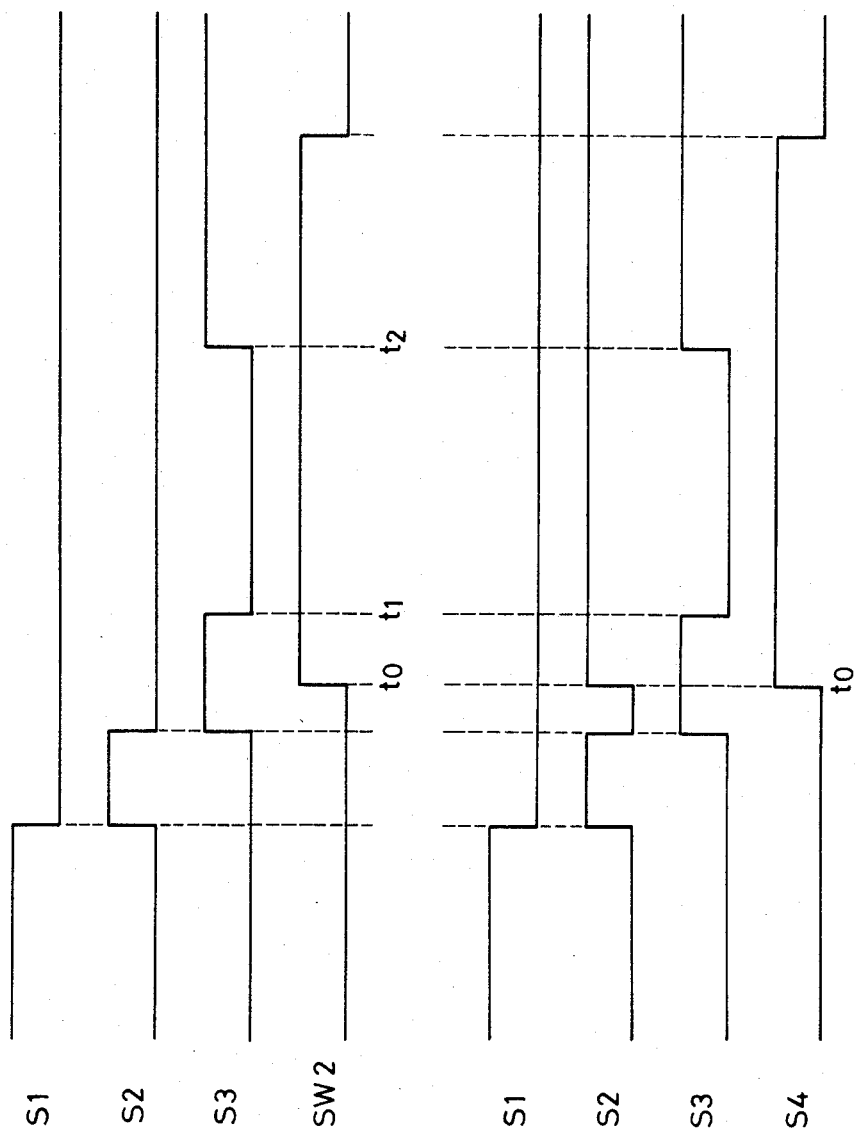

4,513,236

CONTROL METHOD FOR STEPPING MOTOR

BACKGROUND OF THE INVENTION

1. Field of the Invention

The present invention relates to a control method for a novel stepping motor and a novel stepping motor with unipolar or bipolar winding type.

2. Description of the Prior Art

At the transition of a stepping motor from the moving state to the stopped state, the rotor reaches standstill after damping vibration around the target stable point. In order to reduce the period of such damping vibration, it has been proposed to dissipate the kinetic energy of the rotor and to rapidly damp the vibration when the rotor reaches the target stable point by appropriately controlling the energized phase and the energizing time.

However such method is scarcely effective in case the load to the motor varies, and the manner of convergence of vibration fluctuates significantly every time due to the fluctuation in the torque of the motor itself. For this reason, in actual use, the damping time required converging the vibration has to be determined with an ample margin. Consequently a closed loop control for example with an additional position detector has been indispensable for a high-speed operation.

SUMMARY OF THE INVENTION

The object of the present invention, therefore, is to provide a novel stepping motor and to a novel control method for a stepping motor of unipolar or bipolar winding type, which is not associated with the aforementioned drawbacks and enables to reduce the rotor vibration without short-circuiting the unenergized coils and to reduce the damping time without requiring closed loop control.

BRIEF DESCRIPTION OF THE DRAWINGS

FIGS. 3A and 3B are waveform charts showing the function of the present invention;

FIG. 4 is a circuit diagram showing another embodiment of the present invention;

FIGS. 6A and 6B are waveform charts showing the function of still another embodiment of the present invention.

DETAILED DESCRIPTION OF THE PREFERRED EMBODIMENTS

First Embodiment

Now the present invention will be clarified in detail by an embodiment thereof shown in the attached drawings.

Figure 1:
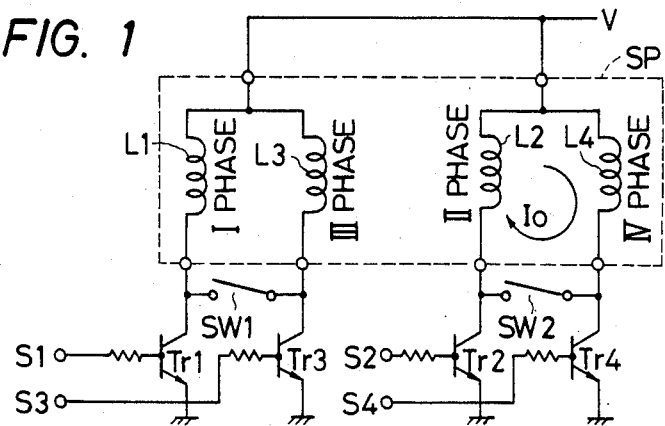
FIG. 1 is a circuit diagram of an embodiment of the present invention.

FIG. 1 is a circuit diagram of an embodiment of the present invention in which a stepping motor with four-phase unipolar coils is driven by one-phase energizing method. The broken-lined frame indicates the stepping motor SP, of which phase coils L1–L4 are energized in succession by the conduction of driving transistors Tr1–Tr4 corresponding to phase signals S1–S4. Switches SW1, SW2 are provided for shortcircuiting the coils when the motor is stopped.

Figure 2A:
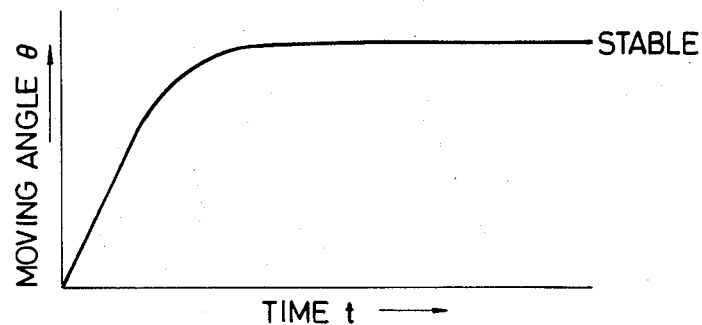
FIGS. 2A, 2B and 2C are charts showing the stopped state of the motor.
Figure 2B:
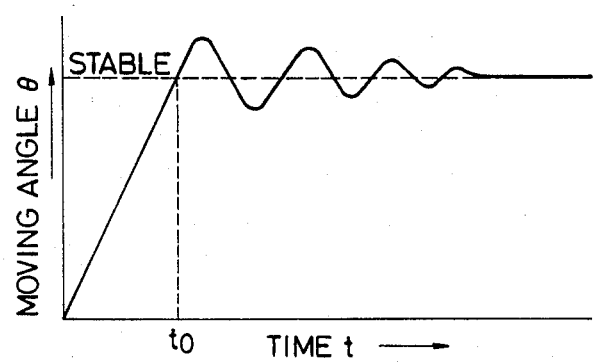
Figure 2C:
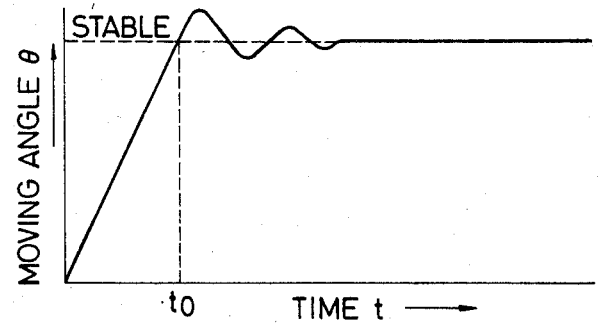

As an example, let us consider a case in which the motor is driven stably in succession by phase I, phase II and phase III, and is stopped at the phase III drive state. The motor stops without vibration as shown in FIG. 2A, if the rotor of the motor has zero kinetic energy when it reaches the stable point of the phase III drive state. However stopping with vibration as shown in FIG. 2B is usual in practice, due to fluctuation in the load to the motor, fluctuation in the torque of the motor itself, or fluctuation in the interval of the phase signals. Therefore, the coils of the phase II and of the phase IV are shortcircuited by closing the switch SW2, as shown in FIG. 3A, at a timing $t_0$ when the rotor of the motor is supposed to reach the stable point. Said timing $t_0$ does not necessarily correspond to the stable point in the absence of a closed loop control. In this manner an inverse electromotive force is generated in the coils L2, L4 of the phases II and IV as shown in FIG. 1 during the vibration at the stopping of the motor, thereby generating a loop current $I_0$ and rapidly damping the vibration. FIG. 2C shows an example of motor stopping by such shortcircuiting of the coils of the phases II and IV. Instead of the switches SW1 and SW2 shown in FIG. 1, there may be employed another method such as rendering the driving transistors Tr2, Tr4 simultaneously conductive to introduce currents in the coils of the phases II and IV as shown in FIG. 3B, whereby the unbalance in the currents cause an effect similar to that of the aforementioned loop current.

The foregoing method, explained in relation to the one-phase drive of a stepping motor with four-phase unipolar coils, is naturally applicable also to motors other than 4-phase coils, and to multi-phase drive method.

Second Embodiment

Now there will be explained another embodiment in which a stepping motor with 4-bipolar coils is driven by 1-phase energizing method. Broken-lined frames in FIG. 4 illustrate different phases of the stepping motor. A phase signal S1 activates transistors Tr1, Tr4, Tr5; a phase signal S3 activates transistors Tr2, Tr3, Tr6; a phase signal S2 activates transistors Tr7, Tr10, Tr11; and a phase signal S4 activate transistors Tr8, Tr9, Tr12, thus respectively energizing the coils of the phases I, II, III and IV. Swithches SW1, SW2 are provided for shortcircuiting the coils when the motor is stopped. As an example, let us consider a state in which the motor is stably driven in succession in the phases I, II and III, and is stopped in the phase III drive state. The switch SW2 is closed as shown in FIG. 3A to shorcircuit the coil B at a timing $t_0$ when the rotor of the motor is supposed to reach the stable point of the phase drive, whereby an inverse electromotive force is generated in the coil B during the vibration at the stopping of the motor and the resulting loop current $I_0$ shown in FIG. 4 attenuates the vibration in the same manner explained before.

Third Embodiment

Figure 5:
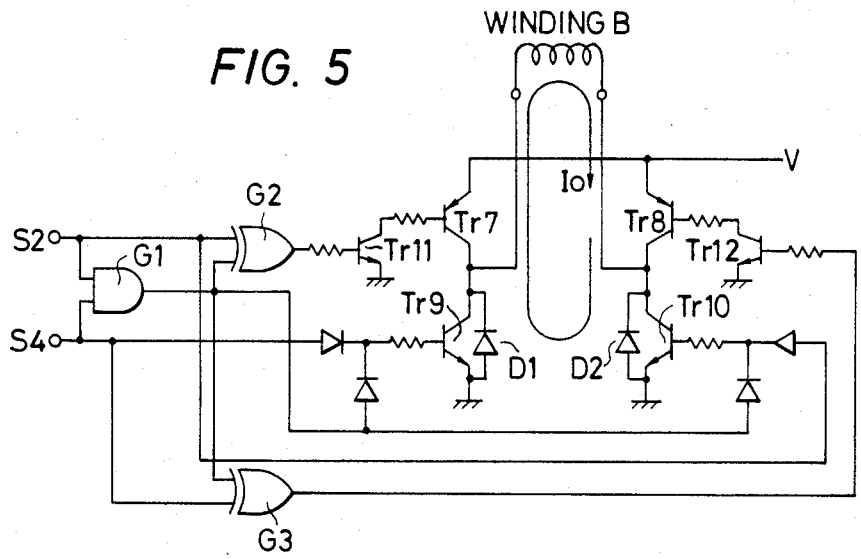
FIG. 5 is a circuit diagram showing still another embodiment of the present invention.

In the foregoing embodiments there are required 6 signals in total, i.e. 4-phase signals and 2 additional signals for controlling the switches SW1, SW2. Another embodiment shown in FIG. 5 achieves a similar effect solely by the phase signals. In contrast to the foregoing embodiments in which the loop current $I_0$ is generated by closing the switch SW2, the present embodiment obtains the loop current $I_0$ by simultaneously shifting the phase signals S2, S4 as shown in FIG. 3B. Upon simultaneous receipt of the phase signals S2, S4, gates G1, G2, G3 maintain transistors Tr7, Tr8, Tr11 and Tr12 but activate transistors Tr9, Tr10, whereby the loop current $I_0$ flows in the order of a diode D1, coil B, transistor Tr10 and diode D1, or a diode D2, coil B, transistor Tr9 and diode D2, thus achieving an effect similar to that obtained by closing the switch SW2.

The foregoing embodiment, explained in relation to the 1-phase drive of a stepping motor with 4-phase bipolar coils, is naturally applicable also to motors other than 4-phase type and to the multi-phase driving methods.

Fourth Embodiment

Figure 7:
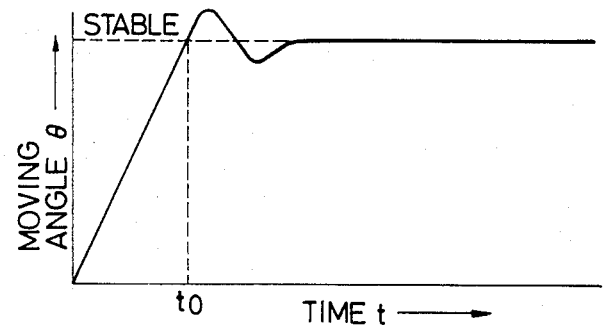
FIG. 7 is a chart showing the stopped state of the motor of the present invention.

In this embodiment the switch SW2 shown in FIG. 1 is closed at a timing $t_0$ when the rotor of the motor is supposed to reach the stable point as shown in FIG. 6A, whereby an inverse electromotive force is generated in the coils L2, L4 of the phases II, IV during the vibration at the stopping of the motor, whereby a loop current $I_0$ is generated in said coils to attenuate the vibration. Then the phase signal S3, which is slightly longer than the phase signal S2, is terminated at a timing t1, since the energization of the phase III generates a strong force toward the stable point and gives rise to the overshooting phenomenon, if the rotor is not positioned at the stable point. If the energization of the phase III is terminated at the timing t1 and the phases II and IV are shortcircuited, the motor steps practically without vibration, since the rotor is driven toward the stable point only by a relatively weak force of the motor magnets and is placed under the braking force of the loop current $I_0$. FIG. 7 shows an example of motor stopping in this manner. If the phase signal S3 is again started at a timing $t_2$, the rotor is completely stopped and maintained at the phase III, and such state can be utilized for example for the hammer action of the printer.

Instead of the switches SW1, SW2, there may be employed another suitable method such as simultaneously activating the driving transistors Tr2, Tr4. This can be achieved by supplying the phase pulses S2, S4 for the phases II, IV simultaneously at a timing $t_0$ as shown in FIG. 6B, whereby the resulting unbalance in the currents causes an effect similar to that of the aforementioned loop current. In this manner the switches SW1, SW2 and the signals for controlling said switches can be dispensed with.

The above-described method, explained in relation to the 1-phase drive of a stepping motor of 4-phase unipolar coils, can naturally be applied also to motors other than 4-phase coils and to the multi-phase drive method. Also such method can significantly improve the print quality if it is applied to the stopping operation of a daisy typefont wheel or to the movement and stopping of a printing carriage.

As explained in the foregoing, the present invention allows to easily reduce the damping time of a stepping motor with an open loop control, thereby enabling high-speed operation of the stepping motor without addition for example of a position detector.

What we claim is:

1. A control method for controlling the operation of a stepping motor having a rotor, said method comprising the steps of energizing plural coils in succession to move the stepping motor rotor to a target point, and
coupling two coils to one another, other than a coil being energized, to define a closed circuit containing said two coils, said coupling step comprising the step of grounding said two coils.

2. A control method for controlling the operation of a stepping motor according to claim 1 including the further step of temporarily interrupting the energization of said energized coil.

3. A control method for controlling the operation of a stepping motor according to claim 1, wherein said coupling step comprises the step of concurrently energizing said two coils.

4. A control method for controlling the operation of a stepping motor having a rotor, said method comprising the steps of energizing plural coils in succession to move the stepping motor rotor to a target point,
coupling two coils to one another, other than a coil being energized to define a closed circuit containing said two coils; and
temporarily interrupting the energization of said energized coil.

5. A control method for controlling the operation of a stepping motor according to claim 4 wherein said coupling step comprises the step of connecting said two coils.

6. A control method for controlling the operation of a stepping motor according to claim 4, wherein said coupling step comrprises the step of concurrently energizing said two coils.

7. A control method for controlling the operation of a stepping motor according to claim 4 wherein said coupling step comprises the step of grounding said two coils.

8. A stepping motor control device comprising:
a plurality of separately energizable coils;
a movable member arranged for movement in response to sequential energization of said coils;
means for energizing said coils sequentially; and
means for stopping the motor, including switch means arranged to couple two coils to one another, other than a coil being energized, to define a closed circuit containing said two coils, wherein said coils are connected mutually in parallel across a current supply source, each of said coils having associated therewith respective switch means for sequentially energizing the coils from the source, and wherein said stopping means includes means for operating two of said respective switch means concurrently to define said closed circuit.

9. A stepping motor control device according to claim 8 wherein the two coils connected in said closed circuit are disposed on opposite sides of the coil defining said stop position.

10. A stepping motor control device according to claim 8 wherein said switching means comprises a transistor.

11. A stepping motor control device according to claim 8 further including means for temporarily interrupting the energization of said energized coil.

12. A stepping motor control device according to claim 8 wherein the two coils connected in said closed circuit are disposed on opposite sides of the coil defining the stop position.

13. A stepping motor control device comprising:
a plurality of separately energizable coils;

a movable member arranged for movement in response to sequential energization of said coils;

means for energizing said coils sequentially; and means for stopping the motor, including switch means arranged to couple two coils to one another, other than a coil being energized, to define a closed circuit containing said two coils, wherein the two coils connected to said closed circuit are disposed on opposite sides of the coil defining said stop position.

14. A stepping motor control device according to claim 13 wherein said switching means comprises a transistor.

15. A stepping motor control device according to claim 13, further including means for temporarily interrupting the energization of said energized coil.

* * * * *

UNITED STATES PATENT AND TRADEMARK OFFICE
CERTIFICATE OF CORRECTION

PATENT NO. : 4,513,236
DATED : April 23, 1985
INVENTOR(S) : Noriyuki Kikukawa and Yasuaki Yamada It is certified that error appears in the above-identified patent and that said Letters Patent is hereby corrected as shown below:

Title "CONTROL METHOD FOR STEPPING MOTOR" to read
-- ELECTRIC STEPPING MOTOR AND METHOD FOR CONTROLLING SAME --;

Title Page, insert -- Priority of Japanese Applications
126770/1980 filed 7.22.82
12251/1983 and 12252/1983 filed 1.27.83. --

Title Page [57] ABSTRACT, "This invention discloses a control method for a novel stepping motor and a novel stepping motor" to read -- This invention discloses a novel stepping motor and a novel control method --;

Column 1, lines 6 and 7, "The present invention relates to a control method for a novel stepping motor and a novel stepping motor with" to read -- The present invention relates to a novel stepping motor and to a novel control motor with --.

Signed and Sealed this

Twenty-second Day of October 1985

[SEAL]

Attest:

DONALD J. QUIGG

Attesting Officer

Commissioner of Patents and
Trademarks—Designate